US012761733B2

(12) United States Patent
Mao et al.

(10) Patent No.: US 12,761,733 B2
(45) Date of Patent: Oct. 13, 2026

(54) VIBRATION MOTOR

(71) Applicant: AAC Microtech (Changzhou) Co., Ltd., Changzhou (CN)

(72) Inventors: Lubin Mao, Changzhou (CN); Wei Song, Changzhou (CN); Jie Ma, Changzhou (CN); Yun Tang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 2 days.

(21) Appl. No.: 18/762,629

(22) Filed: Jul. 2, 2024

(65) Prior Publication Data

US 2025/0284340 A1 Sep. 11, 2025

Related U.S. Application Data

(63) Continuation of application No. PCT/CN2024/080288, filed on Mar. 6, 2024.

(51) Int. Cl.
*H04B 3/36* (2006.01)
*G06F 3/01* (2006.01)

(52) U.S. Cl.
CPC .................................... *G06F 3/016* (2013.01)

(58) Field of Classification Search
CPC .......... G06F 3/016; H02K 33/02; H02K 5/04; H02K 41/0354; H02K 33/16; B06B 1/045
See application file for complete search history.

(56) References Cited

U.S. PATENT DOCUMENTS

| | | | | |
|---|---|---|---|---|
| 11,462,984 B2 * | 10/2022 | Cui | B06B 1/045 |
| 11,681,374 B2 * | 6/2023 | Zhuang | H02K 11/215 345/173 |
| 12,051,957 B2 * | 7/2024 | Mao | H02K 33/16 |
| 2020/0212776 A1 * | 7/2020 | Ling | H02K 33/16 |
| 2020/0212779 A1 * | 7/2020 | Tang | H02K 33/16 |
| 2024/0072625 A1 * | 2/2024 | Okamoto | H02K 33/02 |

FOREIGN PATENT DOCUMENTS

CN 214380585 U * 10/2021

* cited by examiner

*Primary Examiner* — Toan N Pham
(74) *Attorney, Agent, or Firm* — Wiersch Law Group

(57) ABSTRACT

This invention provides a vibration motor. The vibration motor includes a housing with a containment space, a vibration component, and a stator component. The vibration component includes a mass block, a magnet assembly fixed to the mass block, and an elastic component supporting the mass block in the containment space. The magnet assembly includes a magnet fixed to the mass block, which has a magnetized magnetic circuit with a Halbach array structure. By designing the magnetized magnetic circuit in a Halbach array manner, the complex distribution of magnetic pole enhances the magnetic field performance of the magnet assembly and significantly increases the driving force of the vibration motor, providing users with strong vibration feedback and enhancing user experience.

12 Claims, 13 Drawing Sheets

VIBRATION MOTOR

TECHNICAL FIELD

This invention relates to the field of electromechanical devices, particularly to a vibration motor used in portable electronic devices.

BACKGROUND

With the development of electronic technology, portable consumer electronic products are becoming increasingly popular, such as mobile phones, handheld game consoles, navigation devices, or handheld multimedia entertainment devices, which generally use vibration motors for system feedback, such as phone call alerts, message alerts, navigation prompts, game console vibration feedback, etc. Such widespread applications require excellent performance of vibration motors.

The vibration motor of the related technology includes an outer housing with a containment space, a vibration component located in the containment space, and a stator component fixed to the outer housing. The vibration component typically consists of a mass block and a magnet fixed to the mass block, while the stator component includes a coil that interacts with the magnet to provide driving force. However, in the related technology, the regular shape of the magnet and the single magnetization direction of the magnetic poles result in low utilization of the magnet, a simple magnetic circuit, and insufficient driving force of the motor.

Therefore, it is necessary to provide a new vibration motor to solve the above technical problems.

SUMMARY

One of the purposes of the present invention is to provide a vibration motor with better magnetic field performance and stronger driving force.

In order to achieve the purpose mentioned above, the present invention provides a vibration motor which comprises a housing with a containment space, a vibration component contained in the containment space and an elastic component supporting the mass block in the containment space. The vibration component includes a mass block spaced apart from the housing and a magnet assembly fixed to the mass block. The vibration motor further comprises a stator component. The magnet assembly includes a magnet fixed to the mass block, and the magnet has a magnetizing magnetic circuit with a Halbach array structure.

As an improvement of the vibration motor as described above, the magnetizing magnetic circuit is a three-pole magnetizing magnetic circuit or a five-pole magnetizing magnetic circuit, and the magnet is integrated magnetized or segmented magnetized.

As an improvement of the vibration motor as described above, when the magnetization magnetic circuit is a five-pole magnetization magnetic circuit and the magnet is magnetized integrally, the magnet includes a first magnetization region, a second magnetization region, a third magnetization region, a fourth magnetization region, and a fifth magnetization region arranged sequentially along a vibration direction of the vibration component; magnetization directions of the first magnetization region and the fifth magnetization region are the same and both are magnetized along a direction vertical to the vibration direction; a magnetization direction of the third magnetization region is opposite to that of the first magnetization region and is magnetized along the direction vertical to the vibration direction, and magnetization directions of the second magnetization region and the fourth magnetization region are opposed to each other and both are magnetized along the vibration direction.

As an improvement of the vibration motor as described above, when the magnetizing magnetic circuit is a five-pole magnetizing magnetic circuit and the magnet is magnetized segmentally, the magnet includes a first sub-magnet, a second sub-magnet, a third sub-magnet, a fourth sub-magnet, and a fifth sub-magnet arranged in sequence along a vibration direction of the vibration component; magnetization directions of the first sub-magnet and the fifth sub-magnet are the same and both are magnetized along a direction vertical to a vibration direction, a magnetization direction of the third sub-magnet is opposite to that of the first sub-magnet and is magnetized along the direction vertical to the vibration direction, and magnetization directions of the second sub-magnet and the fourth sub-magnet are opposite to each other and both are magnetized along the vibration direction.

As an improvement of the vibration motor as described above, when the magnetization magnetic circuit is a three-pole magnetization magnetic circuit and the magnet is integrally magnetized, the magnet includes a sixth magnetization region, a seventh magnetization region, and an eighth magnetization region arranged sequentially along the vibration direction, magnetization directions of the sixth magnetization region and the eighth magnetization region are opposite and both magnetized along a direction vertical to the vibration direction, and a magnetization direction of the seventh magnetization region is magnetized along the vibration direction.

As an improvement of the vibration motor as described above, the mass block includes an accommodating hole passing therethrough, and an inner wall surrounding the accommodating hole; the magnet assembly is accommodated in the accommodating hole and fixed to the inner wall; the stator component includes a coil component fixed to the housing and partially accommodated in the accommodating hole and set opposite to the magnet assembly; and a flexible circuit board is fixed to the housing and connected to the coil component.

As an improvement of the vibration motor as described above, the magnet assembly includes two groups each being disposed on both sides of the coil assembly along the vibration direction, and the magnet assemblies are provided with opposite magnetic poles.

As an improvement of the vibration motor as described above, the magnet assembly further includes a magnetic conductive plate fixed to the inner wall, the magnet being fixed to one side of the magnetic conductive plate away from the inner wall, and the magnetic conductive plate and the magnet are completely overlapped along the vibration direction.

As an improvement of the vibration motor as described above, when the magnet is magnetized as a whole, the magnet is integrally formed by magnet material and magnetic conductive material.

As an improvement of the vibration motor as described above, the mass block includes an accommodation cavity for accommodating the magnet assembly; the mass block comprises side walls and bottom walls for forming the accommodation cavity; the stator component includes a coil component fixed to the housing in the accommodation cavity and a flexible circuit board fixed to the housing and connected to the coil component, the coil component is located on one side of the magnet assembly away from the bottom wall.

Such a vibration motor, as described above, comprises a housing with a containment space, a vibration component contained in the containment space, and a stator component. The vibration component includes a mass block spaced apart from the housing, a magnet assembly fixed to the mass block, and an elastic component supporting the mass block in the containment space. The magnet assembly includes magnet fixed to the mass block, with a magnetically polarized magnetic circuit having a Halbach array structure. Designing the magnetically polarized magnetic circuit in a Halbach array manner complicates the polarity distribution of the magnetic circuit, effectively enhancing the magnetic field performance of the magnet assembly, significantly increasing the driving force of the vibration motor, allowing the vibration motor to provide strong vibration feedback to users, and enhancing the user experience.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings, in which.

DETAILED DESCRIPTION OF THE EMBODIMENTS

The following will be taken in conjunction with the accompanying drawings of embodiments of the present invention, The technical scheme in the embodiment of the invention is clearly and completely described, Obviously, the described embodiments are merely part of the embodiments of the present invention, and not all embodiments are based on the embodiments of the present invention, and all other embodiments attained by those of ordinary skill in the art without inventive effort are within the scope of the present invention.

Figure 1:
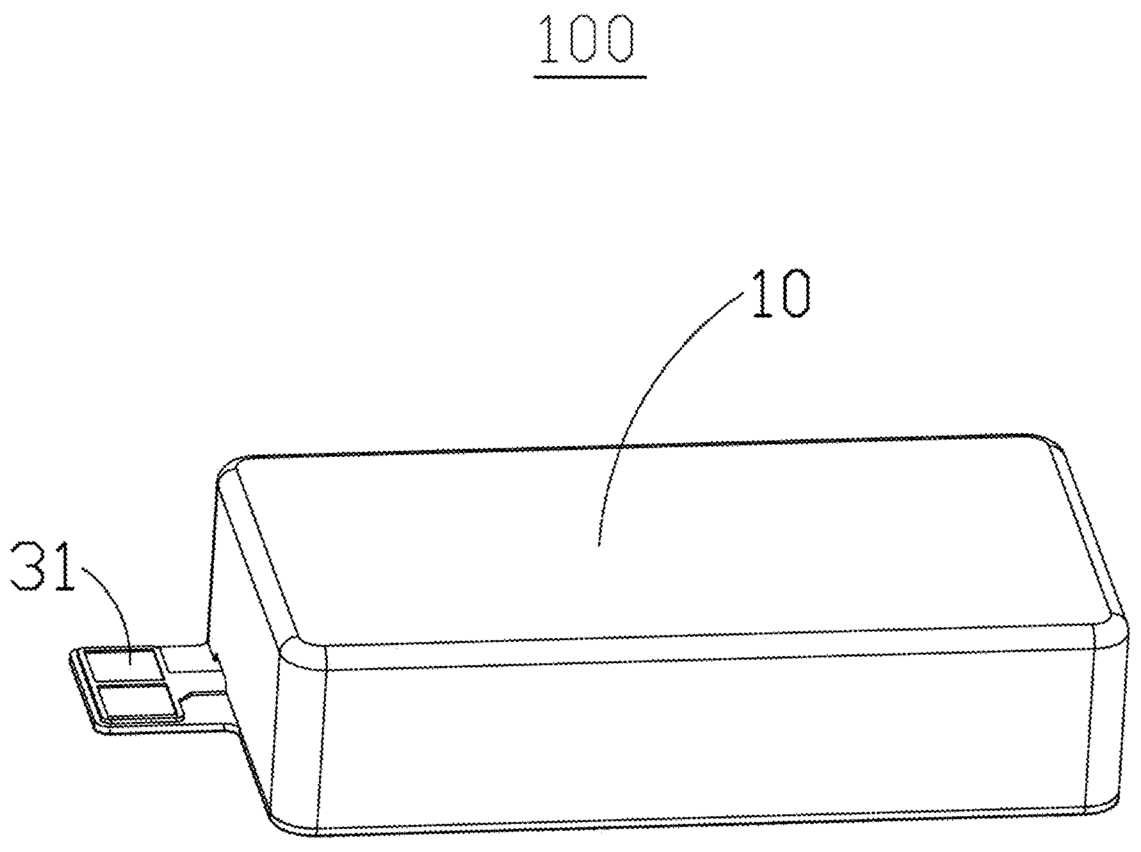
FIG. 1 is an isometric view of a vibration motor in accordance with an exemplary embodiment of the present invention.

As shown in FIG. 1, the present invention provides a vibrating motor 100 in one embodiment, comprising a housing 10 with a containment space, a vibration component 20 housed in the containment space, and a stator component 30.

Please refer to FIGS. 2-7, where the housing 10 comprises an upper housing 11 with a containment space and a lower cover 12 fixed to the upper housing 11, the lower cover 12 surrounding the upper housing 11 to form the containment space.

Please refer to FIGS. 2, 3, 7, and 8. The vibration component 20 includes a mass block 21 spaced apart from the housing 10, a magnet assembly 22 fixed to the mass block 21, and an elastic component 23 supporting the mass block 21 in the containment space and driving the mass block 21 to move back and forth.

Figure 2:
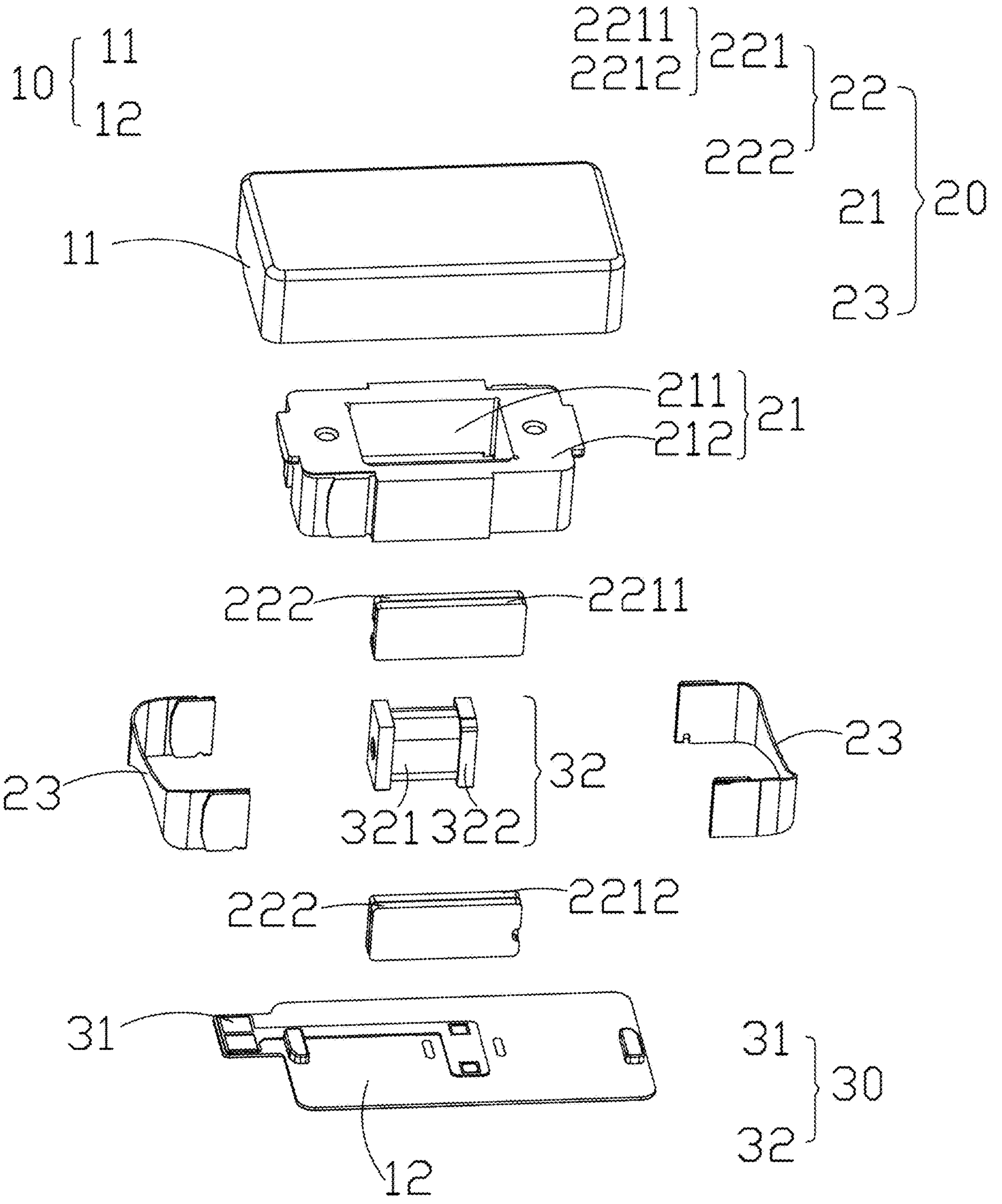
FIG. 2 is an exploded view of the vibration motor in FIG. 1.
Figure 7:
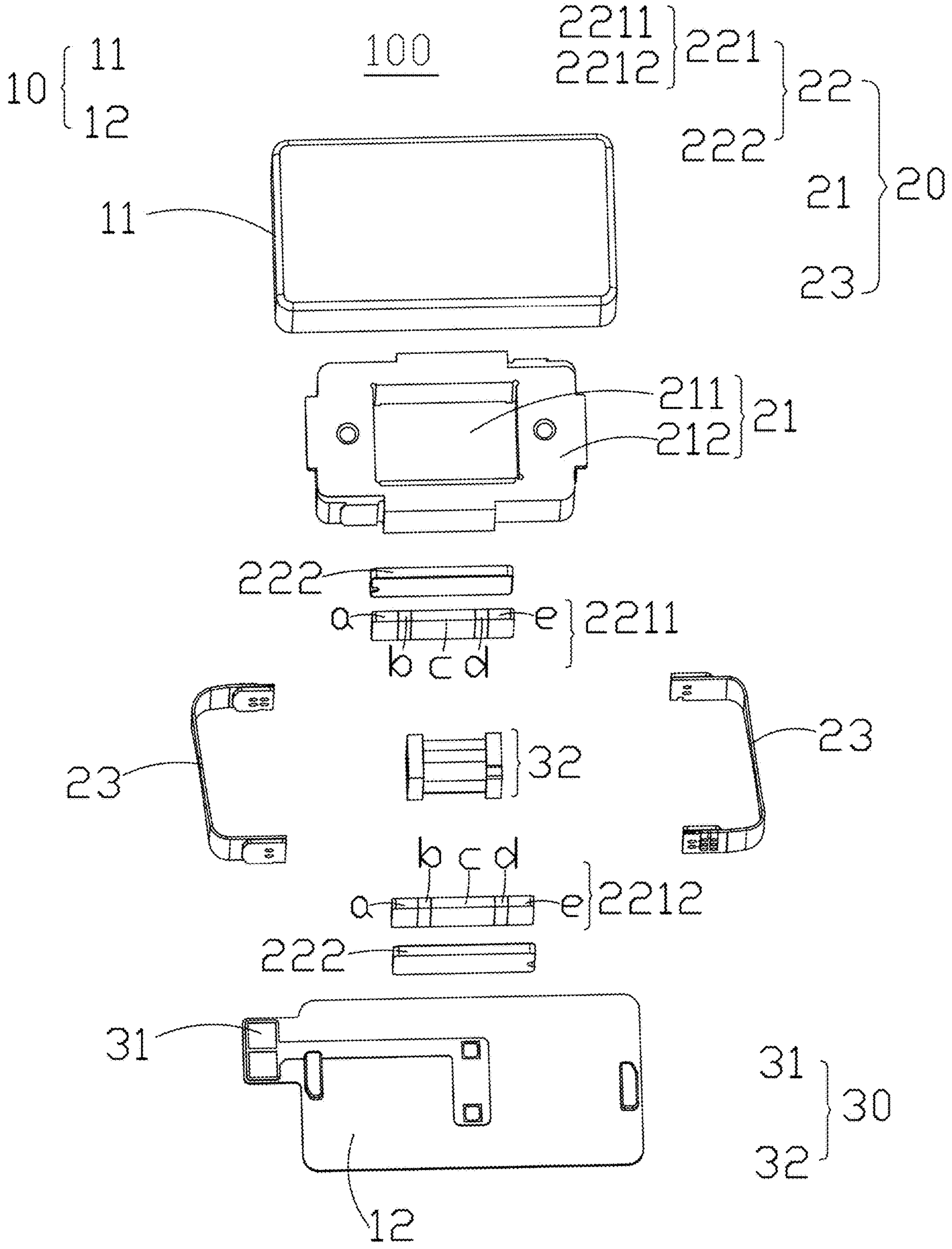
FIG. 7 is an exploded view of a vibration motor in accordance with another exemplary embodiment of the present invention.

Please refer to FIG. 2 and FIG. 7. The magnet assembly 22 includes a magnet 221 fixed on the mass block 21, which has a magnetization magnetic circuit with a Halbach array structure. The magnetization magnetic circuit is a five-pole magnetization magnetic circuit, and the magnet 221 is magnetized integrally or separately. In one feasible embodiment, by designing the magnetization magnetic circuit in a Halbach array manner while keeping the outer dimensions of the magnetic circuit unchanged, the magnetic polarity distribution is made complex, effectively improving the magnetic field performance of the magnet assembly 22, significantly enhancing the driving force of vibration motor 100, allowing the vibration motor 100 to provide users with strong vibration feedback, and improving user experience.

In some implementation examples, please refer to FIG. 2 to FIG. 9, where two sets of magnet assemblies 22 are arranged. These two sets of magnet assemblies 22 are respectively placed on both sides of the coil components 32 along the vibration direction, and the magnets 221 of the two sets of magnet assemblies 22 are arranged with the same polarity. Specifically, the magnets 221 of the two sets of magnet assemblies 22 are the first magnet 2211 and the second magnet 2212. The first magnet 2211 and the second magnet 2212 are set parallel to each other with consistent magnetization structure, but they are arranged with the same polarity on both sides of the coil component 32 and are spaced apart.

As an implementation example, the first magnet 2211 and the second magnet 2212 are both single magnetized and have a five-pole magnetizing magnetic circuit. As shown in FIGS. 2 to 6, each magnet 221 includes the first magnetizing region 1, the second magnetizing region 2, the third magnetizing region 3, the fourth magnetizing region 4, and the fifth magnetizing region 5 arranged in sequence along the vibration direction. The magnetizing direction of the first magnetizing region 1 and the fifth magnetizing region 5 is the same and is magnetized along the vertical vibration direction. The magnetizing direction of the third magnetizing region 3 is opposite to that of the first magnetizing region 1 and is magnetized along the vertical vibration direction. The magnetizing direction of the second magnetizing region 2 and the fourth magnetizing region 4 is opposite and is magnetized along the vibration direction.

Different shapes of magnets 221 can be used, with different magnetic pole directions at different positions, to achieve a more optimal complex magnetic circuit design. Through the integrated forming and magnetizing design of magnets 221, the difficulty of product assembly and production cost can be reduced. For example, please refer to FIGS. 4 and 6, where the N pole of the first magnetizing region 1 of the first magnet 2211 is set opposite and spaced from the N pole of the first magnetizing region 1 of the second magnet 2212, the S pole of the third magnetizing region 3 of the first magnet 2211 is set opposite and spaced from the S pole of the third magnetizing region 3 of the second magnet 2212, the N pole of the fifth magnetizing region 5 of the first magnet 2211 is set opposite and spaced from the N pole of the fifth magnetizing region 5 of the second magnet 2212, the N pole of the second magnetizing region 2 of the first magnet 2211 is set adjacent to the first magnetizing region 1 of the first magnet 2211, the N pole of the fourth magnetizing region 4 of the first magnet 2211 is set adjacent to the fifth magnetizing region 5 of the first magnet 2211, the N pole of the second magnetizing region 2 of the second magnet 2212 is set adjacent to the first magnetizing region 1 of the second magnet 2212, and the N pole of the fourth magnetizing region 4 of the second magnet 2212 is set adjacent to the fifth magnetizing region 5 of the second magnet 2212.

Figure 8:
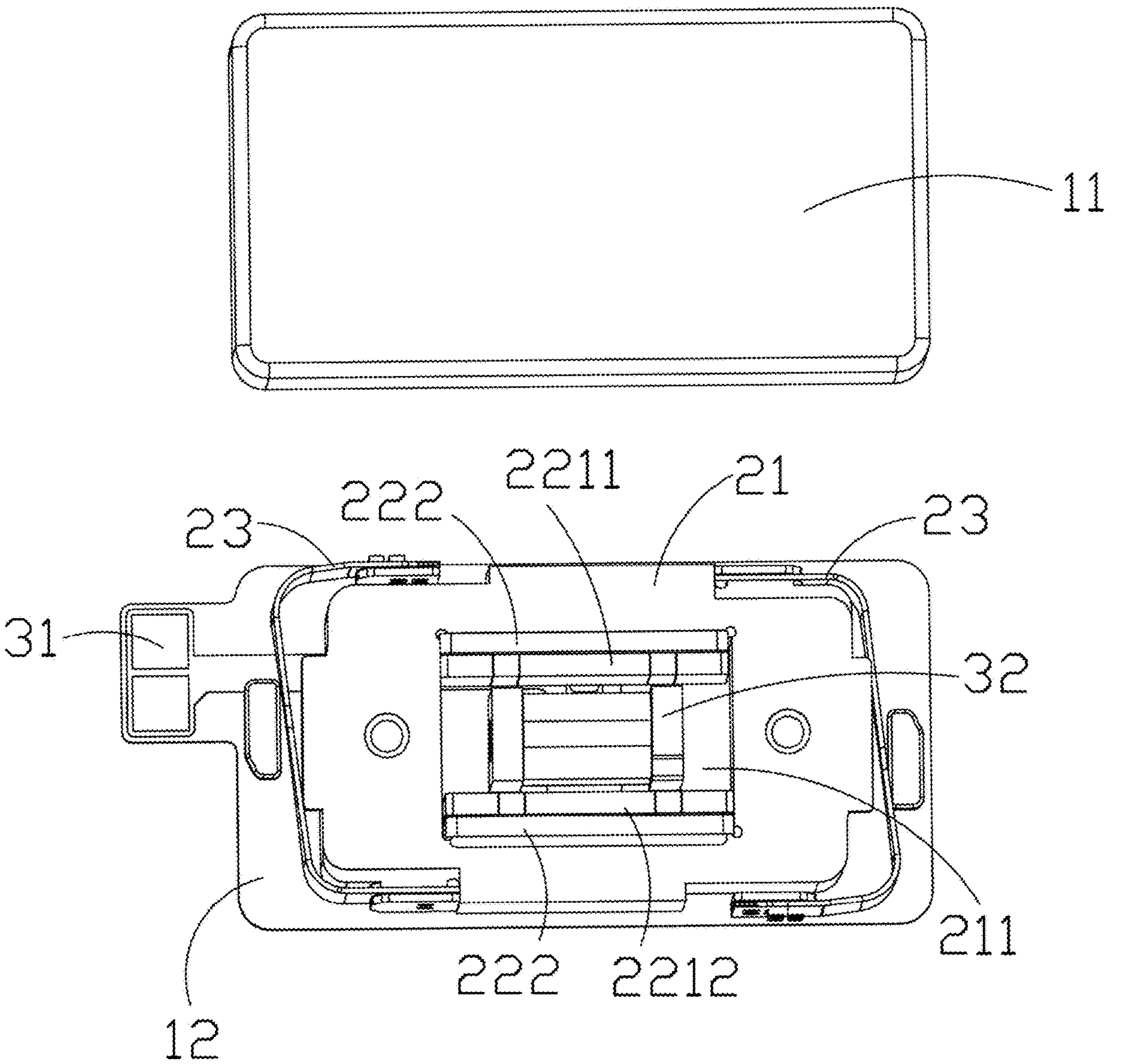
FIG. 8 is a partially exploded view of the vibration motor.
Figure 9:
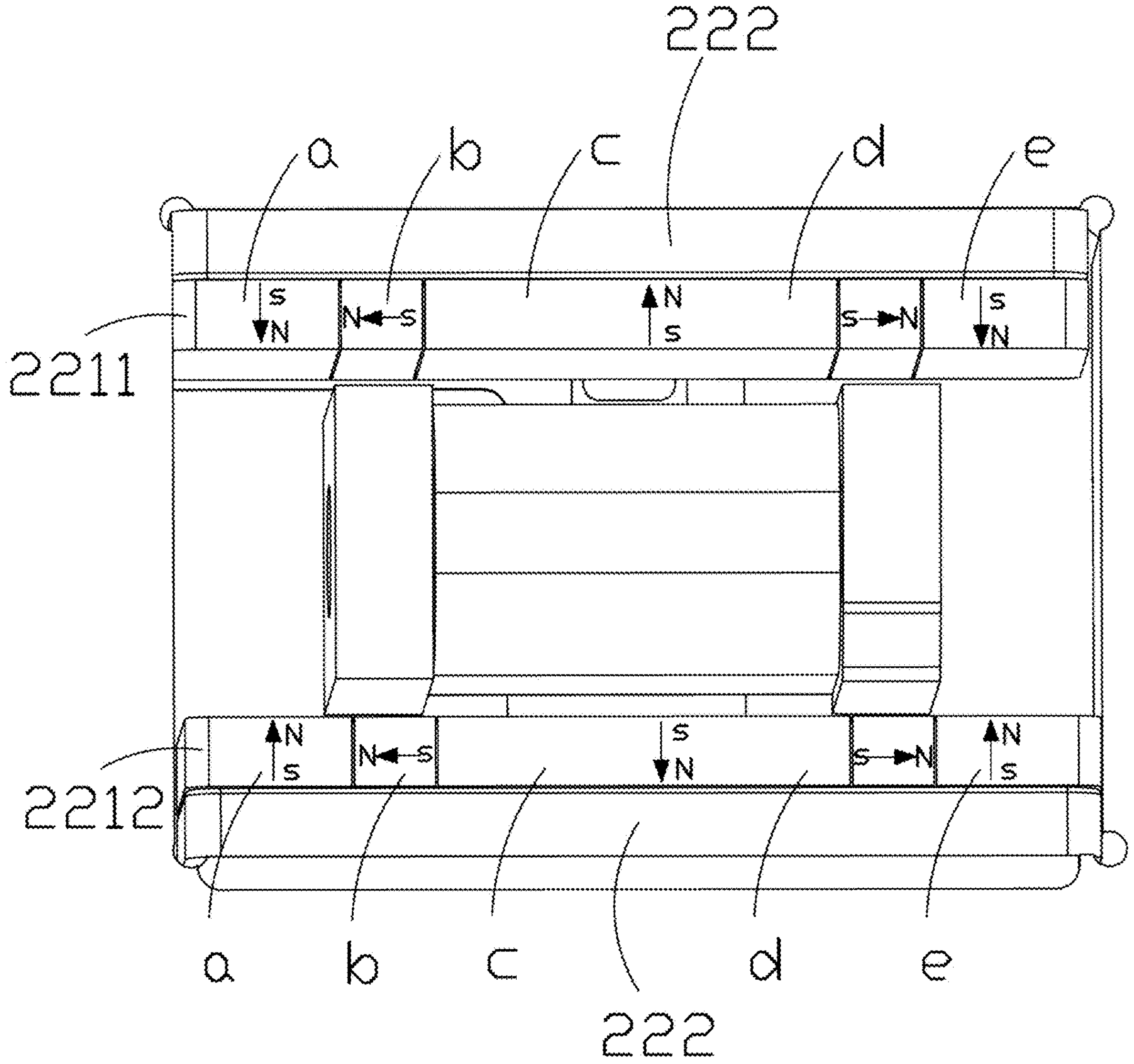
FIG. 9 is a schematic diagram of a magnetization magnetic circuit structure of a magnet shown in FIG. 8.
Figure 10:
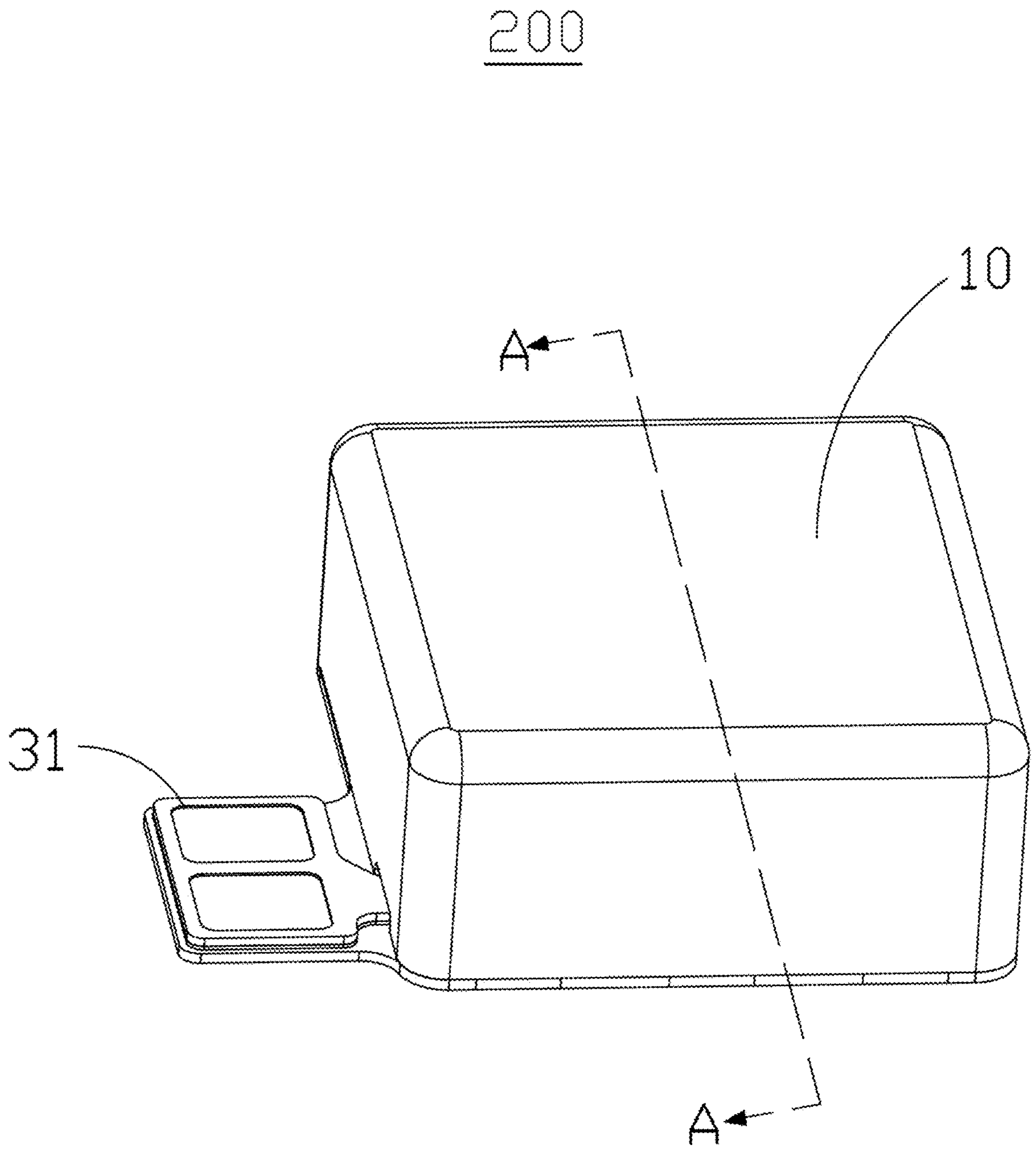
FIG. 10 is an isometric view of a vibration motor in accordance with another embodiment of the present invention.

As an implementation example, the first magnet 2211 and the second magnet 2212 are both split magnetized, and the magnetization magnetic circuit is a five-pole magnetization magnetic circuit. As shown in FIGS. 7-9, the first magnet 2211 and the second magnet 2212 each include the first sub-magnet a, the second sub-magnet b, the third sub-magnet c, the fourth sub-magnet d, and the fifth sub-magnet e arranged in sequence along the vibration direction. The magnetization direction of the first sub-magnet a and the fifth sub-magnet e is the same and both are magnetized along the vertical vibration direction, the magnetization direction of the third sub-magnet c is opposite to that of the first sub-magnet a and is magnetized along the vertical vibration direction, and the magnetization direction of the second sub-magnet b and the fourth sub-magnet d is opposite and both are magnetized along the vibration direction. As an example, please refer to FIG. 9, the N pole of the first sub-magnet a in the first magnet 2211 is arranged opposite and spaced from the N pole of the first sub-magnet a in the second magnet 2212, the S pole of the third sub-magnet c in the first magnet 2211 is arranged opposite and spaced from the S pole of the third sub-magnet c in the second magnet 2212, the N pole of the fifth sub-magnet e in the first magnet 2211 is arranged opposite and spaced from the N pole of the fifth sub-magnet e in the second magnet 2212, the N pole of the second sub-magnet b in the first magnet 2211 is adjacent to the first sub-magnet a in the first magnet 2211, the N pole of the fourth sub-magnet d in the first magnet 2211 is adjacent to the fifth sub-magnet e in the first magnet 2211, the N pole of the second sub-magnet b in the second magnet 2212 is adjacent to the first sub-magnet a in the second magnet 2212, and the N pole of the fourth sub-magnet d in the second magnet 2212 is adjacent to the fifth sub-magnet e in the second magnet 2212.

In one feasible implementation, please refer to FIG. 2, FIG. 3, FIG. 7, and FIG. 8, the magnet assembly 22 further includes a magnetic conductive plate 222 fixed to the inner wall 212, the magnet 221 fixed to one side of the magnetic conductive plate 222 away from the inner wall 212, the magnetic conductive plate 222 and the magnet 221 are completely overlapped along the vibration direction. By coordinating the magnetic conductive plate 222 and the magnet 221, the magnetic field performance of the magnet assembly 22 is effectively improved, significantly enhancing the driving force of the vibration motor, enabling the vibration motor to provide users with strong vibration feedback, and improving user experience.

Figure 3:
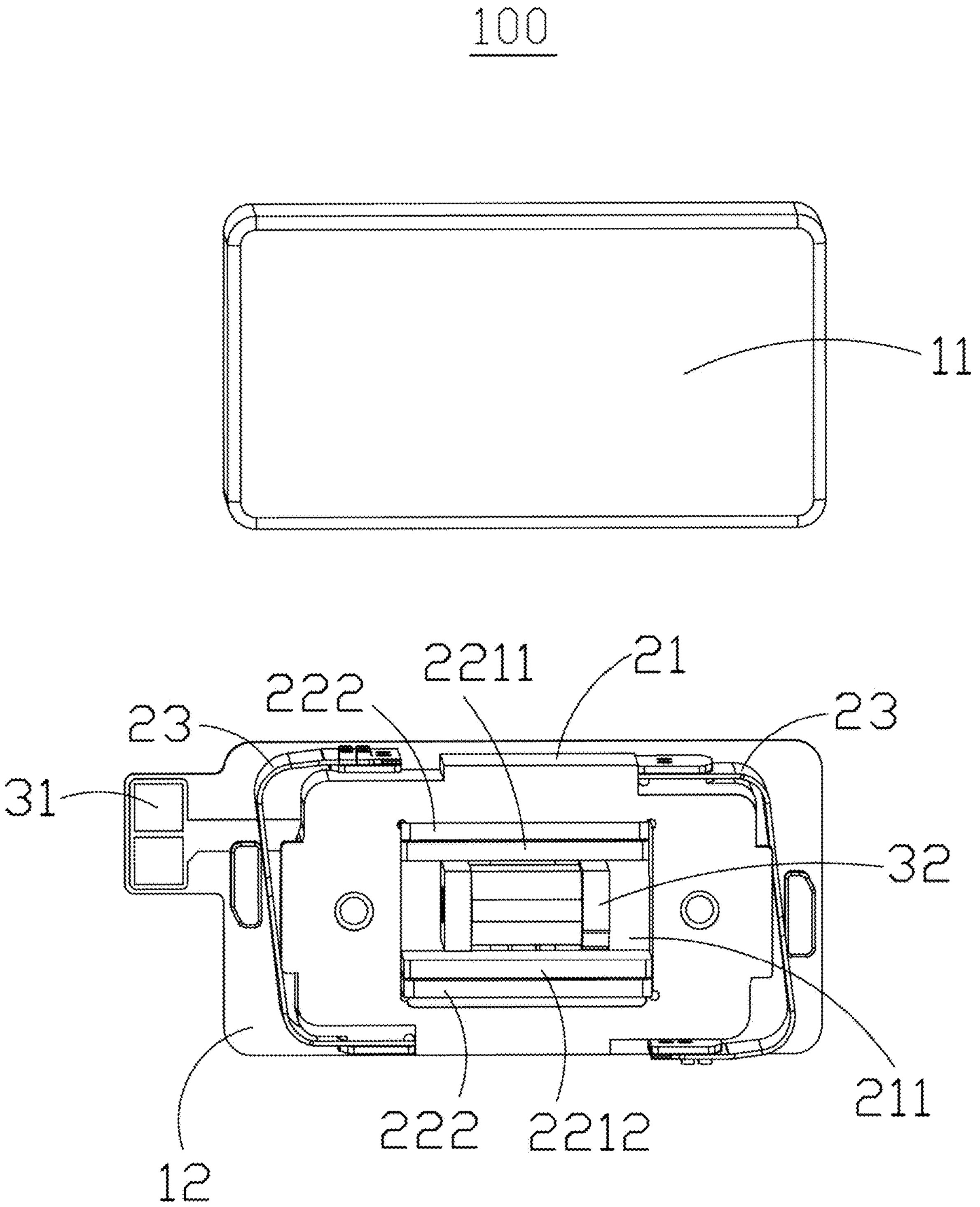
FIG. 3 is a partially exploded view of the vibration motor in FIG. 1.
Figure 4:
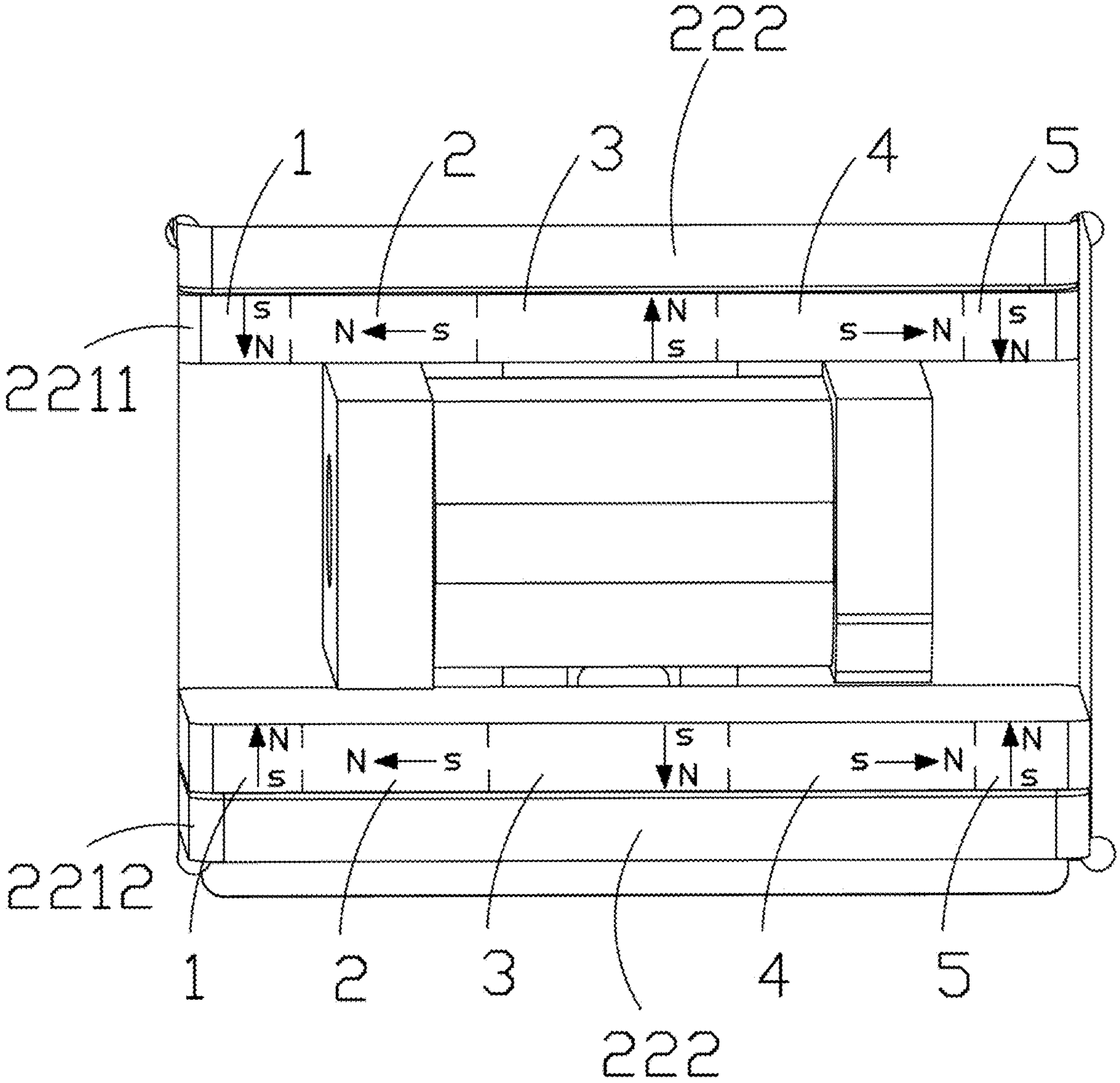
FIG. 4 shows a schematic diagram of a magnetization magnetic circuit of a magnet shown in FIG. 3.

As an implementation example, please refer to FIG. 2 and FIG. 3. When the magnet 221 is magnetized as a unit, the magnet 221 can be bonded to the magnetic guide plate 222, and then assembled with the mass block 21.

Figure 5:
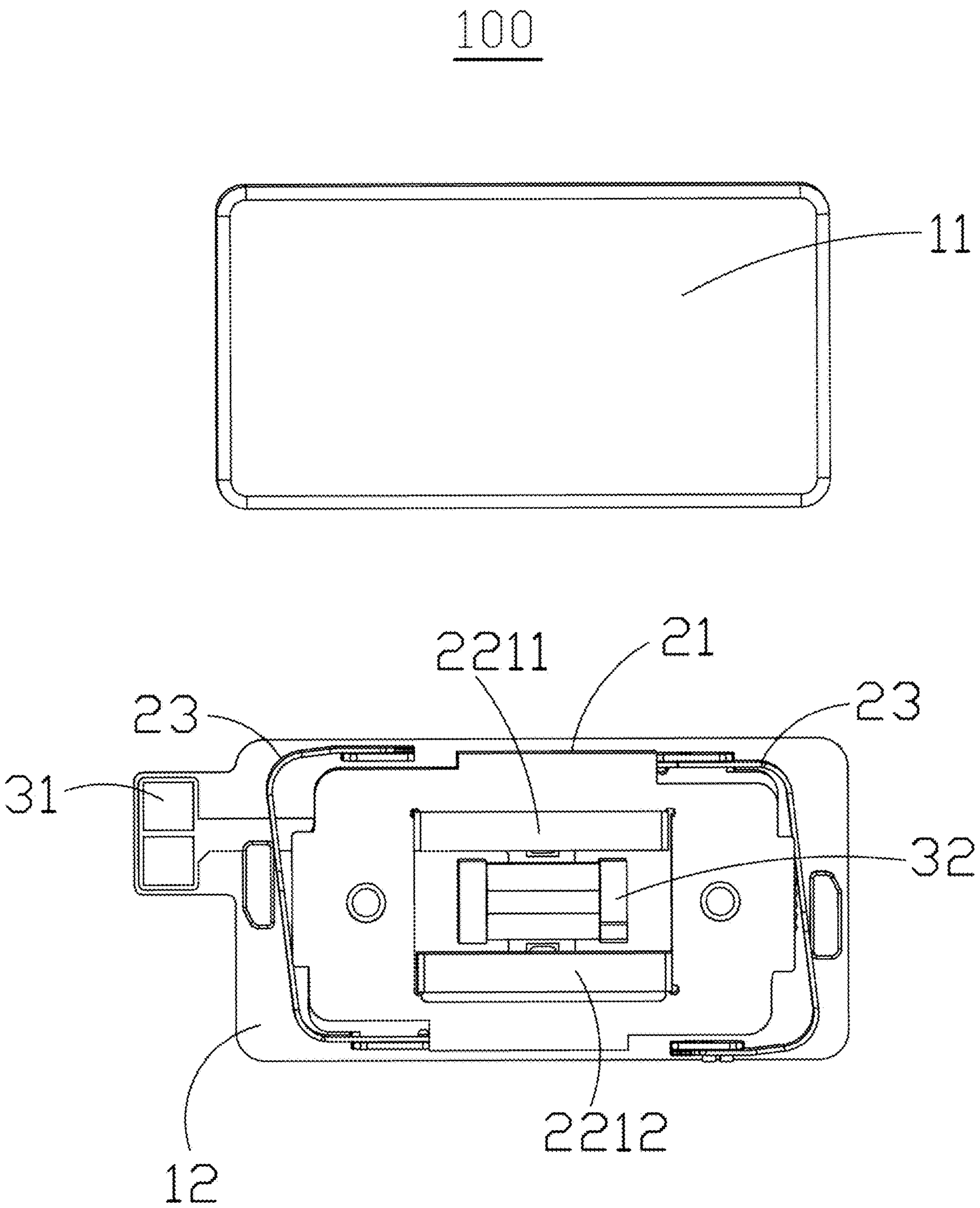
FIG. 5 is a partially exploded view of a vibration motor in accordance with another exemplary embodiment of the present invention.
Figure 6:
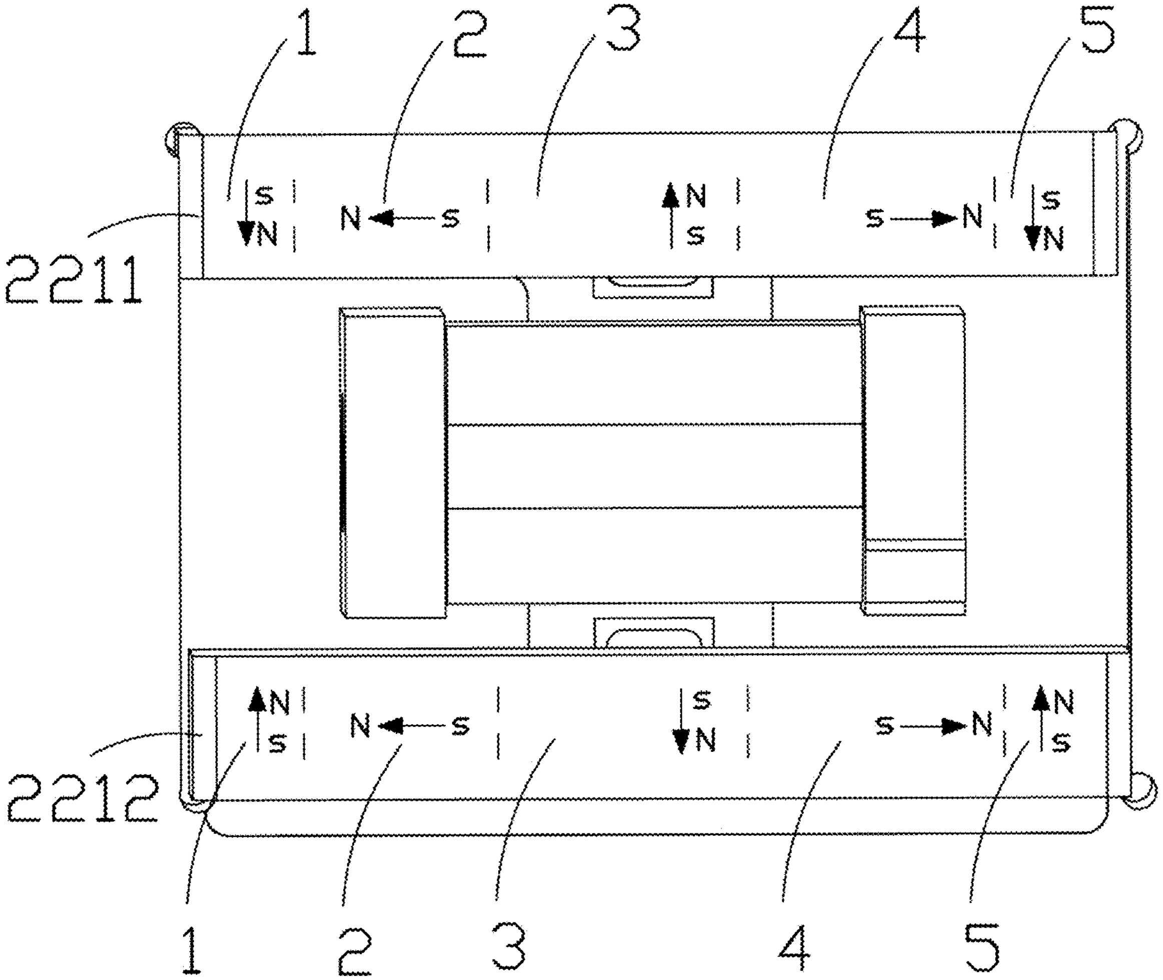
FIG. 6 shows a schematic diagram of a magnetic circuit structure of a magnet shown in FIG. 5.

As an example, please refer to FIGS. 5 and 6, where magnet 221 can be formed by integrating magnet materials and magnetic guiding materials. By integrating magnet materials and magnetic guiding materials, Magnet 221 can be magnetized and then assembled with mass block 21, simplifying the assembly process and reducing production costs.

As an implementation example, please refer to FIG. 7 and FIG. 8, when the split magnet 221 is magnetized separately, each sub-magnet assembly is glued to the magnetic guide plate 222, and then assembled with the mass block 21.

In some implementation examples, please refer to FIGS. 1 to 9. The quality block 21 has a containment hole 211 passing through it. The quality block 21 includes an inner wall 212 that surrounds to form the containment hole 211, and the magnet assembly 22 is housed in the containment hole 211 and fixed to the inner wall 212. The stator component 30 includes a coil component 32 fixed to the housing 10, partially housed in the containment hole 211, and set opposite the magnet assembly 22, as well as a flexible circuit board 31 fixed to the housing 10 and connected to the coil component 32.

Please refer to FIG. 2 and FIG. 7 for details. The coil assembly 32 includes a core 322 fixed to the housing 10 and a coil 321 wound on the core 322, with the coil 321 electrically connected to the flexible circuit board 31. Specifically, the core 322 and the flexible circuit board 31 are both fixed to the bottom cover 12. The coil 321 is housed in a housing hole 211 (as shown in FIG. 3 and FIG. 8) and is arranged opposite to the magnet assembly 22. When the coil 321 is energized, it interacts with the magnet assembly 22 to generate driving force that drives the elastic component 23 to move the mass block 21 along the vibration direction, thereby providing vibration feedback.

In some implementation examples, please refer to FIGS. 2, 3, 7, and 8. Elastic component 23 is set in two groups, and the two groups of elastic components 23 are respectively arranged on both sides of mass block 21 along the vibration direction. Mass block 21 is connected to the inner housing 10 through elastic component 23 for active connection.

As shown in FIGS. 10-13, another vibrating motor 200 is provided in an embodiment of the present invention, which includes a containment space housing 10, a vibration component 20 accommodated in the containment space, and a stator component 30.

Figure 11:
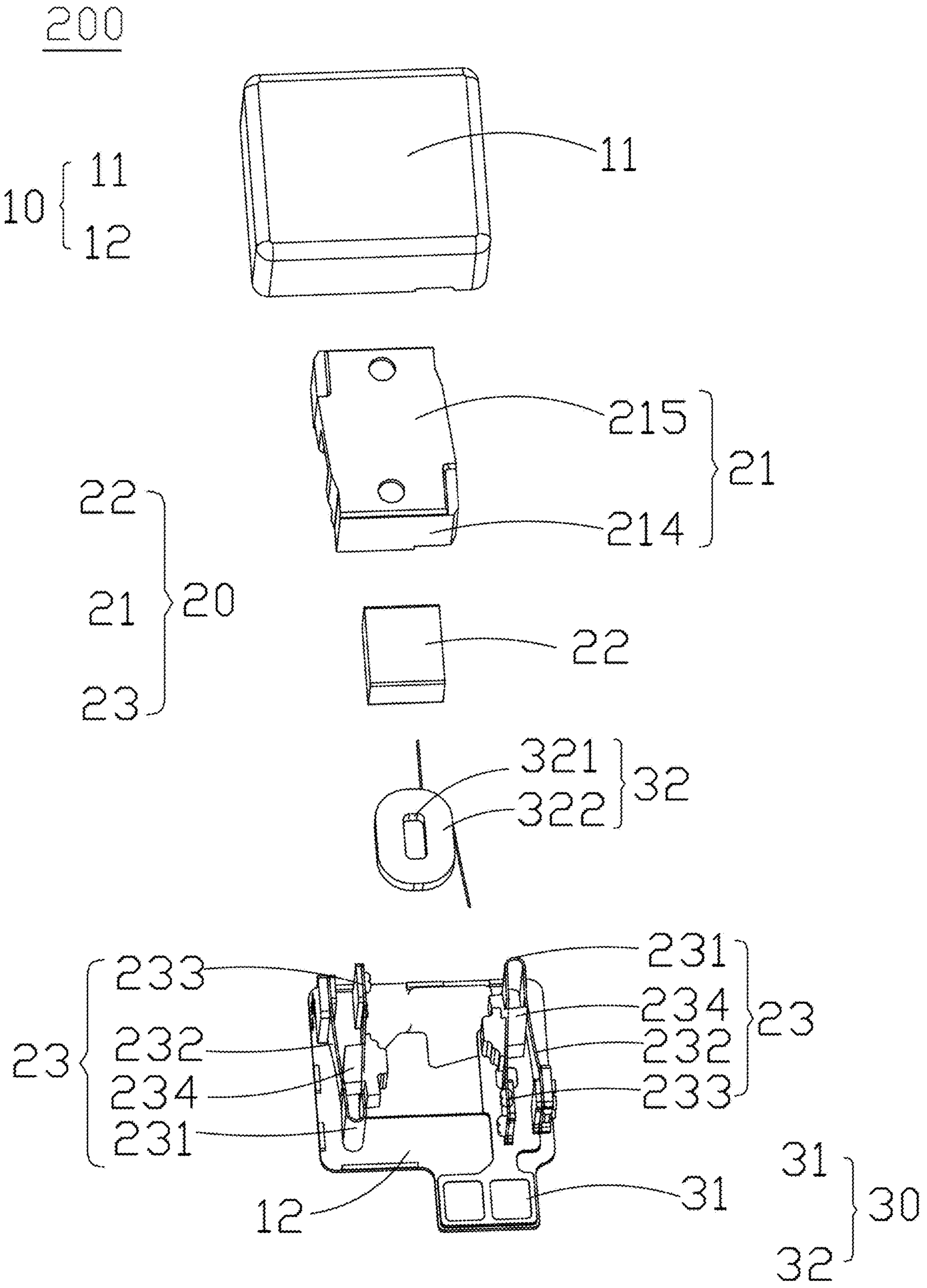
FIG. 11 is an exploded view of the vibration motor in FIG. 10.

See FIG. 11, where the housing 10 comprises an upper housing 11 with a containment space and a lower cover 12 fixed to the upper housing 11, the lower cover 12 surrounds the upper housing 11 to form a containment space.

Figure 12:
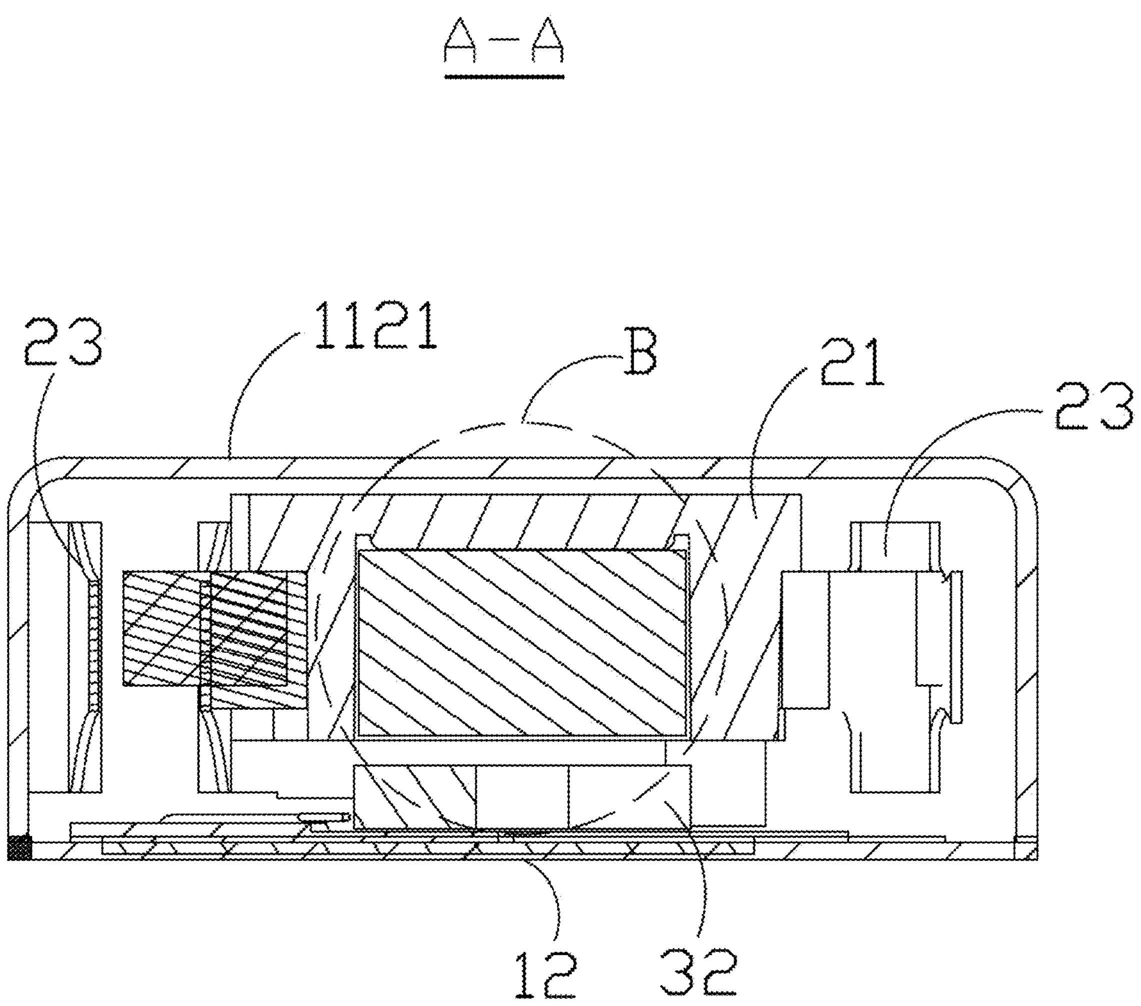
FIG. 12 Is a cross-sectional view of the vibration motor in FIG. 10, taken along line A-A.

Refer to FIGS. 11 and 12. The vibration assembly 20 includes a mass block 21 spaced apart from the housing 10, a magnet assembly 22 fixed to the mass block 21, and an elastic component 23 supporting the mass block 21 in the containment space and driving the mass block 21 to reciprocate.

Please refer to FIGS. 10-13. The magnet assembly 22 includes the magnet 221 fixed to the mass block 21, and the magnet 221 has a demagnetization magnetic circuit with a Halbach array structure.

The vibrating motor 200 provided in this implementation example is different from the vibrating motor 100 in FIG. 1 in that the mass block 21 is provided with an accommodation cavity 213 housing a magnet assembly 22, the mass block 21 includes side walls 214 and a bottom wall 215 surrounding to form the accommodation cavity 213; the stator component 30 includes a coil component 32 fixed to the accommodation cavity 213 and the housing 10, and a flexible circuit board 31 fixed to the housing 10 and connected to the coil component 32, the coil component 32 is located on the side of the magnet assembly 22 away from the bottom wall 215.

Figure 13:
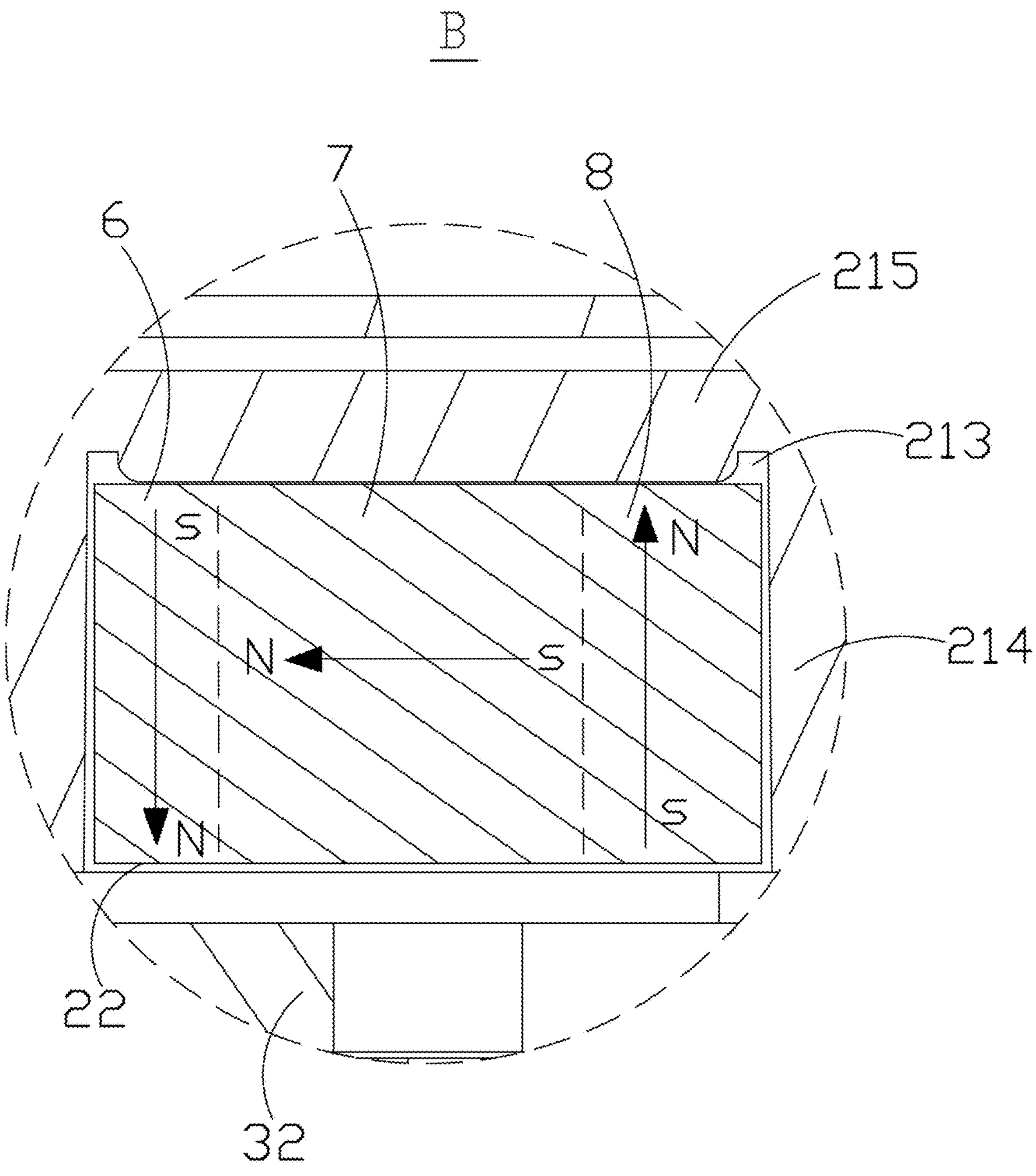
FIG. 13 is an enlarged view of Part B in FIG. 12, and shows magnetization circuit structure of corresponding magnet.

The magnet assembly 22 is set in a group, and the coil component 32 is placed on one side of the magnet assembly 22 away from the bottom wall 215. The magnetization magnetic circuit is a three-pole magnetization magnetic circuit and the magnet 221 is integrally magnetized. The magnet 221 includes the sixth magnetization region 6, the seventh magnetization region 7, and the eighth magnetization region 8 arranged in sequence along the vibration direction. The magnetization directions of the sixth magnetization region 6 and the eighth magnetization region 8 are opposite and both are magnetized along the vertical vibration direction, while the magnetization direction of the seventh magnetization region 7 is magnetized along the vibration direction. As shown in FIG. 13, the magnet 221 of the magnet assembly 22 is the third magnet, the N pole of the sixth magnetization region 6 of the third magnet is adjacent to the coil component 32, the S pole of the eighth magnetization region 8 of the third magnet is adjacent to the coil component 32, the N pole of the seventh magnetization region 7 is adjacent to the sixth magnetization region 6, and the S pole of the seventh magnetization region 7 is adjacent to the eighth magnetization region 8.

Please refer to FIG. 11. The elastic component 23 is set in two groups, with each group of elastic components 23 placed on both sides of the mass block 21 in the vibration direction. The mass block 21 is actively connected to the housing through the elastic component 23.

The elastic component 23 includes an elastic arm portion 231, a first supporting portion 232 extending from one end of the elastic arm portion 231 and connected to the housing 10, a second supporting portion 233 extending from the other end of the elastic arm portion 231 and connected to the mass block 21, and a buffer block 234 placed on the second supporting portion 233 to cushion collisions between the first supporting portion 232 and the second supporting portion 233 and/or between the second supporting portion 233 and the mass block 21. In one feasible embodiment, the buffer block 234 is placed on the second supporting portion 233 to cushion collisions between the first supporting portion 232 and the second supporting portion 233. In one feasible embodiment, the buffer block 234 is placed on the second supporting portion 233 to cushion collisions between the second supporting portion 233 and the mass block 21. In one feasible embodiment, the buffer block 234 is placed on the second supporting portion 233 to cushion collisions between the first supporting portion 232 and the second supporting portion 233, and between the second supporting portion 233 and the mass block 21. For example, the buffer block 234 can be a soft rubber block, which can reduce the collision friction between the first supporting portion 232 and the second supporting portion 233 and/or between the second supporting portion 233 and the mass block 21. Preferably, the thickness of the side wall of the mass block 21 connected to the elastic component 23 gradually decreases along the second supporting portion 233 towards the elastic arm portion 231 to avoid compressing the elastic arm portion 231.

The foregoing is merely illustrative of embodiments of the present invention, and it should be noted that modifications may be made to those skilled in the art without departing from the spirit of the invention but are intended to be within the scope of the invention.

What is claimed is:

1. A vibration motor comprising:

a housing with a containment space;

a vibration component contained in the containment space, including a mass block spaced apart from the housing, a magnet assembly fixed to the mass block, and an elastic component supporting the mass block in the containment space; and a stator component; wherein the magnet assembly includes a magnet fixed to the mass block, and the magnet has a magnetizing magnetic circuit with a Halbach array structure;

when the magnetization magnetic circuit is a five-pole magnetization magnetic circuit and the magnet is magnetized integrally, the magnet includes a first magnetization region, a second magnetization region, a third magnetization region, a fourth magnetization region, and a fifth magnetization region arranged sequentially along a vibration direction of the vibration component: magnetization directions of the first magnetization region and the fifth magnetization region are the same and both are magnetized along a direction vertical to the vibration direction: a magnetization direction of the third magnetization region is opposite to that of the first magnetization region and is magnetized along the direction vertical to the vibration direction, and magnetization directions of the second magnetization region and the fourth magnetization region are opposed to each other and both are magnetized along the vibration direction.

2. The vibration motor as described in claim 1, wherein the mass block includes an accommodating hole passing therethrough, and an inner wall surrounding the accommodating hole; the magnet assembly is accommodated in the accommodating hole and fixed to the inner wall; the stator component includes a coil component fixed to the housing and partially accommodated in the accommodating hole and set opposite to the magnet assembly; and a flexible circuit board is fixed to the housing and connected to the coil component.

3. The vibration motor as described in claim 2, wherein the magnet assembly includes two groups each being disposed on both sides of the coil assembly along the vibration direction, and the magnet assemblies are provided with opposite magnetic poles.

4. The vibration motor as described in claim 3, wherein the magnet assembly further includes a magnetic conductive plate fixed to the inner wall, the magnet being fixed to one side of the magnetic conductive plate away from the inner wall, and the magnetic conductive plate and the magnet are completely overlapped along the vibration direction.

5. The vibration motor as described in claim 3, wherein when the magnet is magnetized as a whole, the magnet is integrally formed by magnet material and magnetic conductive material.

6. A vibration motor comprising:

a housing with a containment space;

a vibration component contained in the containment space, including a mass block spaced apart from the housing, a magnet assembly fixed to the mass block, and an elastic component supporting the mass block in the containment space; and a stator component; wherein the magnet assembly includes a magnet fixed to the mass block, and the magnet has a magnetizing magnetic circuit with a Halbach array structure;

when the magnetizing magnetic circuit is a five-pole magnetizing magnetic circuit and the magnet is magnetized segmentally, the magnet includes a first sub-magnet, a second sub-magnet, a third sub-magnet, a fourth sub-magnet, and a fifth sub-magnet arranged in sequence along a vibration direction of the vibration component; magnetization directions of the first sub-magnet and the fifth sub-magnet are the same and both are magnetized along a direction vertical to a vibration direction, a magnetization direction of the third sub-magnet is opposite to that of the first sub-magnet and is magnetized along the direction vertical to the vibration direction, and magnetization directions of the second sub-magnet and the fourth sub-magnet are opposite to each other and both are magnetized along the vibration direction.

7. The vibration motor as described in claim 6, wherein the mass block includes an accommodating hole passing therethrough, and an inner wall surrounding the accommodating hole; the magnet assembly is accommodated in the accommodating hole and fixed to the inner wall; the stator component includes a coil component fixed to the housing and partially accommodated in the accommodating hole and set opposite to the magnet assembly; and a flexible circuit board is fixed to the housing and connected to the coil component.

8. The vibration motor as described in claim 7, wherein the magnet assembly includes two groups each being disposed on both sides of the coil assembly along the vibration direction, and the magnet assemblies are provided with opposite magnetic poles.

9. The vibration motor as described in claim 8, wherein the magnet assembly further includes a magnetic conductive plate fixed to the inner wall, the magnet being fixed to one side of the magnetic conductive plate away from the inner wall, and the magnetic conductive plate and the magnet are completely overlapped along the vibration direction.

10. The vibration motor as described in claim 8, wherein when the magnet is magnetized as a whole, the magnet is integrally formed by magnet material and magnetic conductive material.

11. A vibration motor comprising:

a housing with a containment space;

a vibration component contained in the containment space, including a mass block spaced apart from the housing, a magnet assembly fixed to the mass block, and an elastic component supporting the mass block in the containment space; and a stator component; wherein the magnet assembly includes a magnet fixed to the mass block, and the magnet has a magnetizing magnetic circuit with a Halbach array structure;

when the magnetization magnetic circuit is a three-pole magnetization magnetic circuit and the magnet is integrally magnetized, the magnet includes a sixth magnetization region, a seventh magnetization region, and an eighth magnetization region arranged sequentially along the vibration direction, magnetization directions of the sixth magnetization region and the eighth magnetization region are opposite and both magnetized along a direction vertical to the vibration direction, and a magnetization direction of the seventh magnetization region is magnetized along the vibration direction.

12. The vibration motor as claimed in claim 11, wherein the mass block includes an accommodation cavity for accommodating the magnet assembly; the mass block comprises side walls and bottom walls for forming the accommodation cavity; the stator component includes a coil component fixed to the housing in the accommodation cavity and a flexible circuit board fixed to the housing and connected to the coil component, the coil component is located on one side of the magnet assembly away from the bottom wall.

* * * * *